United States Patent [19]
Harbison

[11] Patent Number: 4,566,146
[45] Date of Patent: Jan. 28, 1986

[54] RETAINER CLIP FOR A WIPER ARM
[75] Inventor: William H. Harbison, Gary, Ind.
[73] Assignee: The Anderson Company of Indiana, Michigan City, Ind.
[21] Appl. No.: 605,052
[22] Filed: Apr. 30, 1984
[51] Int. Cl.⁴ .............................................. B60S 1/34
[52] U.S. Cl. ................................................. 15/250.34
[58] Field of Search ........................ 15/250.34–250.42; 403/330

[56] References Cited

U.S. PATENT DOCUMENTS 3,011,200 12/1961 Bignon .............................. 15/250.34

FOREIGN PATENT DOCUMENTS 2325587 11/1974 Fed. Rep. of Germany ... 15/250.34
619319 3/1949 United Kingdom ............. 15/250.34
894,034 4/1962 United Kingdom ............. 15/250.34

Primary Examiner—Peter Feldman
Attorney, Agent, or Firm—Wood, Dalton, Phillips, Mason & Rowe

[57] ABSTRACT

A windshield wiper arm having a mounting head with a channel and extension pivoted thereto. The mounting head has a socket with a longitudinal axis and a chamber separated by a common wall. A retainer is affixed in said chamber for latching the wiper arm to a drum head on a drive shaft. The retainer has a body portion and a latch portion with the body portion attached to the common wall for resiliently holding the body portion against the common wall. The latch portion has a rounded hook shaped member with the rounded portion of the hook shaped member overhanging a portion of the socket. A tab is struck from the rounded hook shaped portion and lies transverse to the body portion and transverse to the longitudinal axis of the socket in overhanging relationship with the drum head seated in the socket.

7 Claims, 5 Drawing Figures

RETAINER CLIP FOR A WIPER ARM

DESCRIPTION

1. Field of the Invention

This invention relates to a windshield wiper arm and more particularly to an improved retainer clip for latching the wiper arm onto a drive shaft.

2. Brief Description of Prior Art

The automotive industry has for many years designed automobiles with windshields that are curved in varying degrees. To wipe the windshield, wiper arms and blades are mounted on drive shafts extending through a portion of the automotive body adjacent the lower edge of the windshield. Appropriate motors and linkages are provided to oscillate the drive shaft such that a wiper arm attached to the drive shaft is oscillated across the surface of the windshield. Windshield wiper arms, like windshield wiper blades, must be replaced on a periodic basis. In order to make it possible to replace the wiper arms, simple but effective connections between the mounting head of the arm and the drive shaft are a necessity so that the wiper arm can be readily removed and replaced or repaired.

Some prior art systems provide a threaded portion on the drive shaft which extends through the mounting head of the wiper arm so as to receive a lock nut which is intended to retain the arm on the drive shaft. Other systems have provided various latching arrangements which are carried by the mounting head and engage generally below the overhang of a drum head on the drive shaft, which overlap prevents ready removal of the arm from the drive shaft. Typical of current structures of this kind are shown in the J. W. Anderson U.S. Pat. No. 3,082,026 wherein the latching means is staked in the mounting head and overlaps the drum head on the shaft. The Krohm U.S. Pat. No. 2,715,238 shows a latch which is retained by an adjusting screw in the mounting head such that when the mounting screw is tightened up, the latch will be positively locked below the overhanging portion of the drum head. The Riester et al U.S. Pat. No. 3,600,738 shows a laterally shifting latching arrangement which catches below the drum head to retain the mounting head on the drive shaft. The British Patent No. 1 454 696 shows a retaining member staked in a slot in the mounting head and having a hook-shaped member overhanging the drum head for retaining the arm on the drive shaft.

SUMMARY OF THE INVENTION

Many of the above described prior art patents and of other prior art known to applicant, the wiper arm is capable of working itself loose from the drum head, causing the wiper arm and blade to become disconnected from the vehicle and lost. Others of the prior art required screw drivers or other tools to tighten and loosen the latching arrangement, which immediately complicated the replacement effort and added cost to the resulting system.

It has been found that due to the curved shape of the latching portion of some of the retainers on the mounting head, the forces tending to separate the mounting head from the drum head were operating at an angle due to the curved shape of the overhanging portion such that the lower edge of the drum head cammed the latch out of position and permitted the wiper arm to separate from the drive shaft.

By providing a struck-out portion on the curved shaped latch, the problem of inadvertent disconnection of the wiper arm from the drive shaft has been substantially eliminated. The latching function is still simple enough to be readily removable upon applying a transverse force to the latching portion so as to clear the latch from the drum head whereupon the arm can be removed from the drive shaft.

DETAILED DESCRIPTION OF A PREFERRED EMBODIMENT

Figure 1:
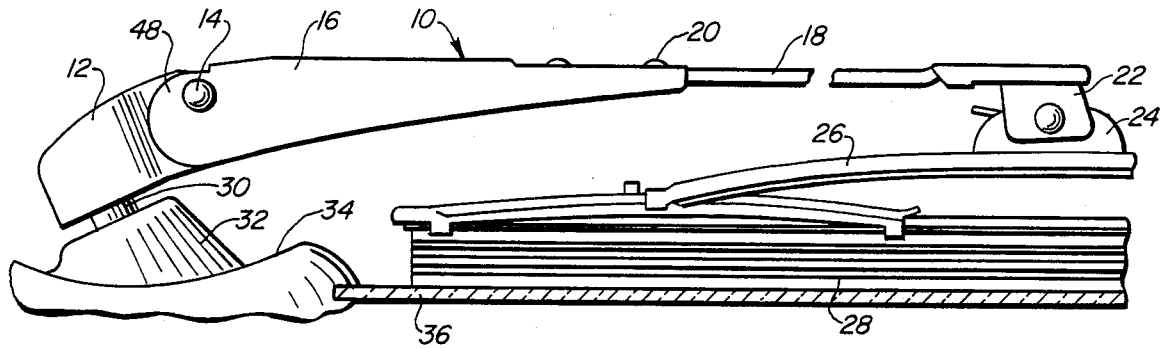
FIG. 1 is a side elevation of a windshield wiper arm attached to a drive shaft of a vehicle.

A windshield wiper arm 10 shown in FIG. 1 has a mounting head 12 pivoted on a transverse pivot pin 14 to a channel shaped portion 16 with an arm extension 18 riveted to the channel at 20. A connector 22 is affixed to the outer end of the extension. The connector 22 is removably connected with a mating connector 24 affixed on a yoke 26 of a windshield wiper blade 28. Since there are many different types of connectors for connecting a wiper arm to a wiper blade, and since the connector between the arm and blade is not an important part of the invention, only a typical connector is shown for illustration purposes. The wiper arm 10 is shown connected to a drive shaft 30 extending through a boss 32 on a cowl 34 at the base of a windshield 36 of a vehicle. The drive shaft 30 is connected to a linkage and motor (not shown) inside the cowl which, when activated, will oscillate the shaft 30, wiper arm 10 and wiper blade 28 in an arc across the surface of the windshield. The connection and disconnection of the mounting head 12 of the wiper arm 10 from the drum head on the drive shaft has been a continuing problem and is specifically addressed by the novel solution herein described and claimed.

In particular, the mounting head 12 of the wiper arm 10 is preferably cast and is made in the form of a cap 37 having a cylindrical recess or socket 38 and a hollow chamber 40 separated from the socket 38 by a common wall 42. The cylindrical wall of the socket 38 has longitudinal serrations or teeth 44, which teeth lie parallel to each other and parallel to the axis of the socket. The mounting head 12 has a cross bore 46 through an end portion 47 remote from the socket 38. The channel shaped member 16 has a pair of parallel extending ears 48 which are adapted to overlap the side walls of the chamber 40 and have apertures which align with the cross bore 46 such that the rivet 14, when passed therethrough will pivotally support the channel 16 on the mounting head 12. The upper surface 52 of the attaching portion of the mounting head has an arcuate shape such that as the channel 16 pivots about the axis of the pin 14, the web joining the ears 48 on the side walls of the channel will clear the curved portion 52 with no interference between the two so that the channel can pivot freely relative to the mounting head. As is conventional, a spring member 54 is mounted in the channel 16 and is connected at one end to the extension 18 and is connected at its other end by means of a hook 56 to a cross pin 60 extending between the side walls of the chamber 40. The spring serves to provide a clockwise resilient force to the channel 16 so as to urge the free end of the arm and the blade toward the windshield.

The outer end of the drive shaft 30 (FIG. 2) has a drum-like member, referred to in the trade as a drum head 60, which is affixed on the end of the shaft 30. The drum head 60 has parallel serrations 62, which serrations are parallel to the axis of the shaft 30 as well as being parallel to each other. The serrations 62 are designed to mate with the serrations 44 in the mounting head 12.

Figure 2:
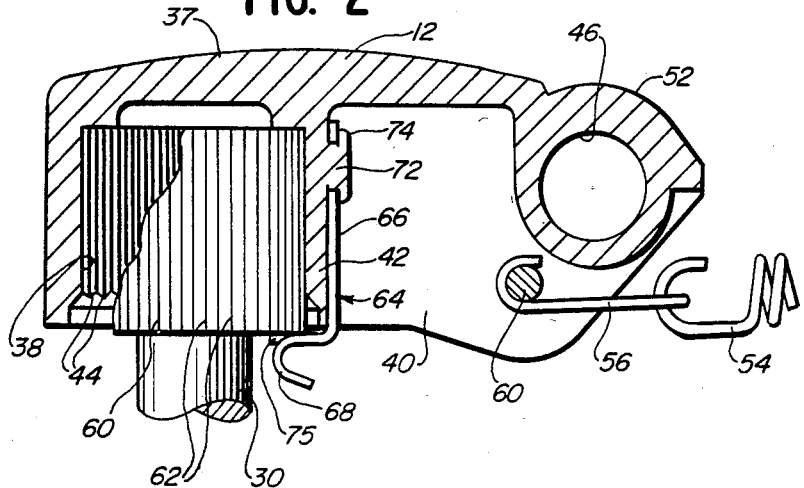
FIG. 2 is an enlarged sectional view of the mounting head portion of the wiper arm illustrating one form of the invention.
Figure 3:
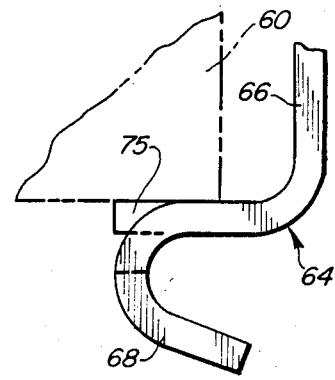
FIG. 3 is an enlarged view with parts broken away illustrating the positive latch member on the retainer which forms a principal element of my invention.
Figure 5:
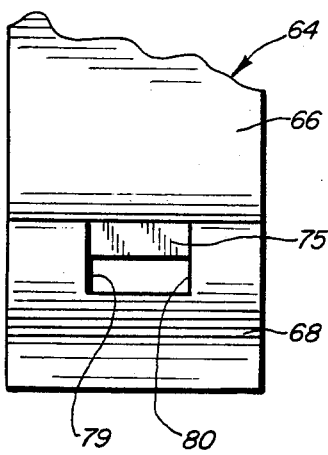
FIG. 5 is a side elevational view of a portion of the retainer as shown in FIG. 3.
Figure 4:
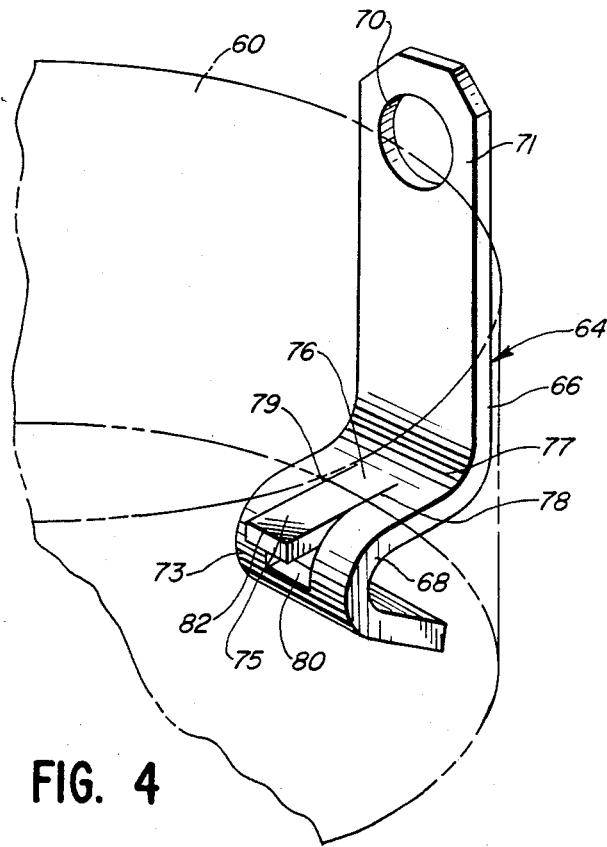
FIG. 4 is an enlarged perspective view of the improved retainer with a drum head shown in phantom.

A latch 64 is provided to retain the mounting head 12 on the drum head 60. The latch 64 is comprised of a elongate body portion 66 and a transverse latch portion 68. The body portion 66 has, near one end thereof, an aperture 70 therethrough, which aperture 70 receives a lug 72 molded integrally with the common wall 42 of the mounting head 12. The latch 64 is held assembled with the lug 72, with the face of the body portion 66 resiliently bearing against the common wall 42 of the mounting head, by swaging the exposed end of the lug, by heat or the like so as to form a head 74 on the lug which overlaps the edges of the aperture 70 to retain the latch 64 assembled on the wall 42. With the latch 64 secured in the hollow chamber 40 in the mounting head, the latching portion 68 of the latch extends transverse to the body portion 66, traverses the end of the wall 42, and overlaps the opening in the socket 38. As shown in FIG. 2 with the mounting head 12 assembled on the drum head 60, the latch portion 68 of the latch overlaps the edge of the drum head 60.

As can best be seen in FIGS. 2, 3, 4 and 5, a sheared portion or tab 75 is formed from the material of the curved latch portion 68 and is shaped to extend in a plane substantially transverse to the plane of the body portion 66. The tab 75 is joined at 76 with the latch and has two side edges or slits 78,79 separated from the curved portion of the latch 68 and has a free end portion 82 extending outwardly from the curved portion 68. The tab 75 lying in a plane transverse to the body portion 66 will abut flush against the overlapping portion of the drum head 60 so that any force tending to separate the drum head 60 from the mounting head 12 operates at right angles to the tab and, due to the relative close proximity between the tab and the body portion 66, the force will not have a component tending to tilt or cam the latch 64 into a disengaging position with respect to the drum head. That is, forces tending to separate the drum head from the mounting head will act at right angles to the plane of the tab 75, which at best attempts to elongate the latch 64 but will not have a component at an angle to the plane of the body portion 66 and therefore there will be no tendency to urge the latch to the right as viewed in FIG. 2.

To make the latch 64, a rectangular blank with cropped corners on one end is punched from an appropriate spring metal sheet. A hole 70 is punched in the cropped end portion 71 and three slits 78, 79 and 80 are punched in the middle of the opposite end portion 73 of the blank. The blank is then given a right angle bend 77 just short of the unpunched web 76 to form an elbow at the junction of the body portion 66 and the latch 68.

The latch 68 is bent back upon itself downwardly and rearwardly to form the curved knee portion of the latch. The area in the die where the tab 75 is positioned is blank so that no bending forces are placed on the tab 75 permitting the tab to remain planar and transverse to the body portion 66. With the tab lying in the plane transverse to the plane of the body portion 66, the force system described hereinabove prevents ready removal of the mounting head 12 from the drum head.

The curved latch 68 is such that it is readily engageable by an operator so that it can be forced to the right as viewed in FIG. 2 to misalign the tab 75 from the socket 38 and drum head 60 whereupon the mounting head 12 of the wiper arm 10 can be readily removed from the drum head. The latch 64 forms a very positive latching arrangement which prevents accidental removal of the wiper arm from the drive shaft and yet at the same time provides a relatively simple but efficient means whereby the latch 68 can be urged to the right as viewed in FIG. 2 which deforms the body portion 66 about the lug 72 until the tab 75 clears the socket 38, whereupon the mounting head 12 can be readily removed from the drum head 60. For installing the mounting head on the drum head, the curved and angled free end portion of the latch 68 is engaged by the drum head and deflected part way out of alignment with the socket 38 whereupon a slight deflection of the latch with a finger or tool will clear the tab 75 from the path of the drum head to permit the drum head to be inserted in the socket 38 in the mounting head. Once the drum head 60 has been completely seated in the socket, the resilience of the latch will force the tab 75 and latching portion 68 into overlapping relationship with the drum head and the common wall 42 so as to retain the drum head in the socket 38.

I claim:

1. In a wiper arm having a mounting head, a socket in the mounting head having a longitudinal axis, a chamber in the mounting head separated from the socket by a common wall, said wall is parallel to the longitudinal axis of the socket, and retainer means in said chamber for latching the wiper arm to a drum head on a drive shaft, the improvement characterized by said retainer means having a body portion and a latch portion, the body portion having an aperture through an end portion remote from the latch portion, a lug projects from the common wall and is staked in the aperture for resiliently holding the body portion against said common wall, the latch portion having a rounded hook shaped member with the rounded portion of the hook shaped member overhanging a portion of the socket, and tab means struck from the rounded hook shaped portion and lying transverse to the body portion and transverse to the longitudinal axis of the socket in overhanging relationship with a portion of the socket.

2. In a wiper arm as claimed in claim 1 wherein said drum head is seated in said socket and said tab means overlaps the edge of the drum head and lies flush against the face of the drum head.

3. In a wiper arm having a mounting head, a channel shaped portion pivotally secured to the mounting head, an extension secured to the channel shaped portion and having means for removably connecting the wiper arm to a wiper blade, a socket in the mounting head; a chamber in the mounting head separated from the socket by a common wall, and retainer means in said chamber and extending into overlapping relation with said socket, the improvement characterized by said retainer means having a body portion and a latch portion, the body portion having one end portion staked to said common wall in said chamber for holding a major portion of said retainer means resiliently against said common wall, the latch portion comprising a rounded hook shaped member with a curved portion of the shaped member overlapping said socket, and means struck from the curved portion of the hook shaped member to provided a planar tab extending transverse to the axis of the socket and overlapping a portion of the socket.

4. In a wiper arm as claimed in claim 3 wherein the axis of the socket lies parallel to the common wall.

5. In a wiper arm having a mounting head, a channel shaped portion pivotally secured to the mounting head, an extension secured to the channel shaped portion and having a connector on the remote end thereof for removably connecting the arm to a wiper blade, the improvement characterized by retainer means for latching the mounting head to a drum head on a drive shaft projecting from adjacent the lower edge of a windshield, the mounting head having a socket for receiving the drum head, a chamber in the mounting head separated from the socket by a common wall, said retainer means having a body portion and a latch portion, the body portion having attaching means formed in the end portion remote from the latch portion, means on the common wall coacting with said attaching means to secure the body portion in said chamber, the latch portion overlaps the junction between the drum head and the common wall, the latch portion having a rounded hook shaped member with the rounded portion bearing against an overhanging portion of the drum head, and tab means struck from the rounded hook shaped portion to provide a planar surface seating flatly against the overhanging portion of the drum head to prevent accidental disconnection between the mounting head and the drum head.

6. In a wiper arm as claimed in claim 5 wherein the tab means extends substantially transverse to the longitudinal axis of the socket.

7. In a wiper arm as claimed in claim 5 wherein the body portion of the latch is resiliently held against the common wall wherein the tab means is substantially transverse to the body portion and to the axis of the socket.

* * * * *